No. 724,921. PATENTED APR. 7, 1903.
A. P. McLELLAN.
VEHICLE GEAR.
APPLICATION FILED OCT. 22, 1902.
NO MODEL. 2 SHEETS—SHEET 1.
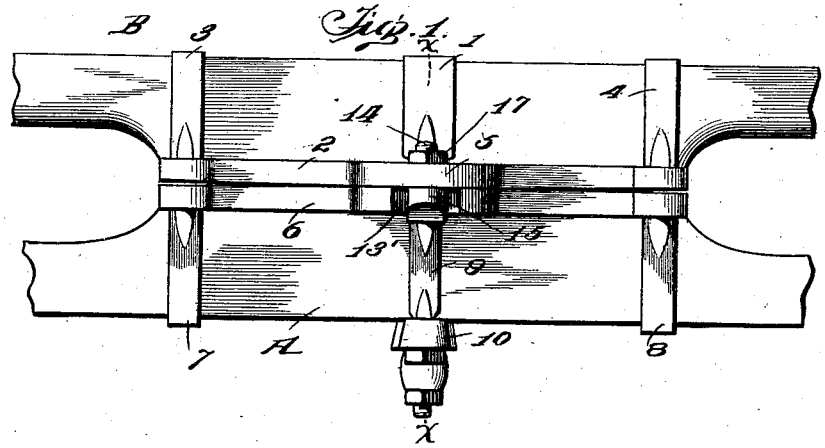
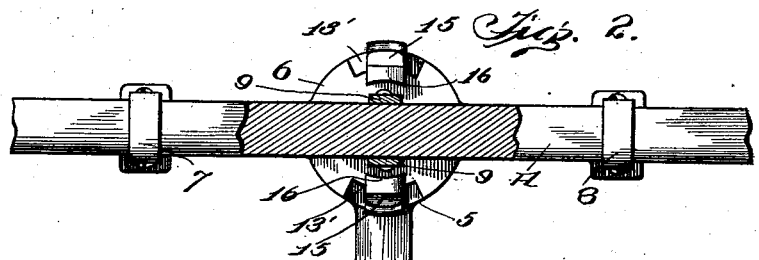
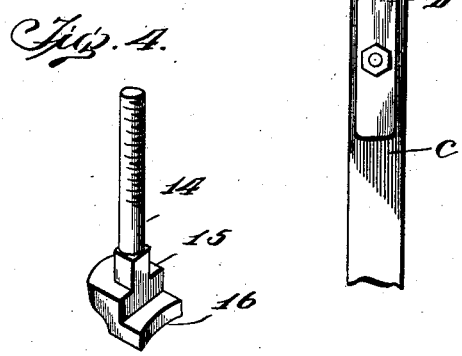
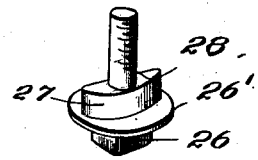

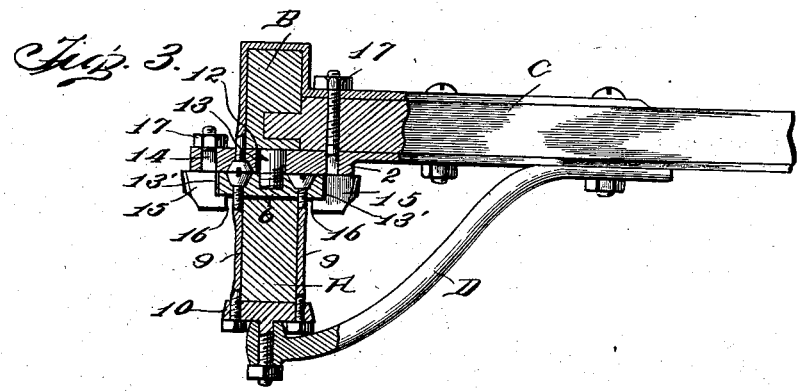
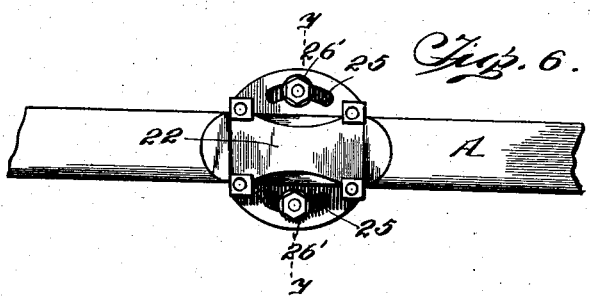
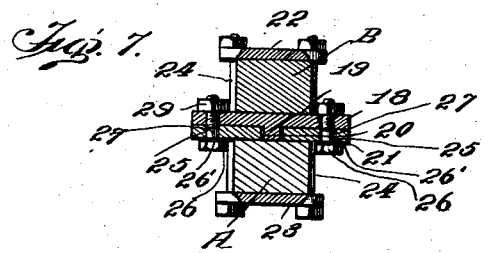
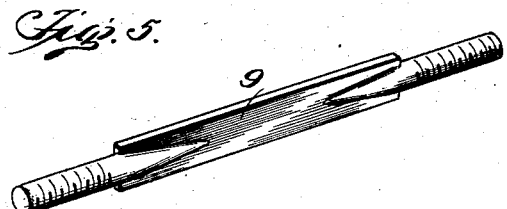

UNITED STATES PATENT OFFICE.

ALEXANDER P. McLELLAN, OF WEST NEWTON, MASSACHUSETTS.

VEHICLE-GEAR.

SPECIFICATION forming part of Letters Patent No. 724,921, dated April 7, 1903.

Application filed October 22, 1902. Serial No. 128,325. (No model.)

*To all whom it may concern:*

Be it known that I, ALEXANDER P. McLELLAN, a subject of the King of Great Britain, residing at West Newton, in the county of Middlesex and State of Massachusetts, have invented certain new and useful Improvements in Vehicle-Gear; and I do hereby declare the following to be a full, clear, and exact description of the invention, such as will enable others skilled in the art to which it appertains to make and use the same.

This invention relates to certain new and useful improvements in the construction of vehicles, and has particular application to the structure of the fifth-wheels and whiffletrees thereof.

This invention has primarily in contemplation the production of a fifth-wheel especially adapted for runabouts and light buggies, which shall obviate the necessity of employing galling-irons and devices of a like character now generally in use for preventing the body of the vehicle being damaged by contact with the wheels in turning. It is also the intention to devise a structure which shall be simple in construction, durable, and of such strength that the portions thereof may be subjected to a great strain without any serious damage resulting. These objects are attained by avoiding the employment of the king-bolt now commonly in use and so constructing the circular bed-plates or turning-plates of the fifth-wheel as to serve the purposes of such king-bolt.

With these ends in view the invention consists in the peculiar construction, combination, and arrangements of parts, as will hereinafter be fully set forth in the specification and claims and illustrated in the appended drawings.

While I have herein shown and described my preferred construction, it will of course be understood that I do not limit myself to the precise form thereof, but that there can be modification as to the proportion of the parts and the minor details of construction without departing from the essence and spirit of the invention or sacrificing any of the advantages thereof.

To a full understanding of the merits of my invention reference is to be had to the accompanying drawings, wherein—

Figure 1 is a front elevation of a portion of a vehicle-axle and head-block, showing my invention applied thereto. Fig. 2 is a bottom plan view of the same, a portion of the axle being shown in section. Fig. 3 is a central vertical section taken on the line $x\ x$ of Fig. 1 and showing the construction of the turning-plates, whereby the use of the king-bolt is obviated. Fig. 4 is a detailed perspective view of the limiting bolt or pin. Fig. 5 is a detail view of one of the strap-bolts. Fig. 6 is a bottom plan view of a modification of my invention. Fig. 7 is a central vertical sectional view of the same, taken on the line $y\ y$ of Fig. 6. Fig. 8 is a detailed view of the limiting-bolt employed in the constructions shown in Figs. 6 and 7.

Referring now to the drawings in detail and in particular to Fig. 1 thereof, A designates the central portion of the vehicle-axle, upon which is movably supported, through the medium of devices to be hereinafter described, the head-block B. As in the ordinary construction of vehicles, a perch, as at C, is rigidly secured at one end to the head-block, and the parts are further reinforced at the point of their juncture by the head-block strap 1. This head-block strap, as will be more clearly seen by reference to Fig. 3, is fastened at one end to the perch C and extends over the head-block B, its lower end, which is rounded and screw-threaded, being screwed into the upper plate 2, which for the sake of convenience I will hereinafter term the "head-block plate." This plate, as will be observed, is further secured to the head-block by means of the saddle-clips 3 and 4 and is provided at its central part with a relatively large and widened portion 5, substantially circular in conformation. The axle portion of the vehicle (A) is also provided with a plate, as at 6, substantially similar in conformation to the plate 2, this plate 6 being secured to the axle by means of the saddle-clips 7 and 8, and is also provided centrally with strap-bolts 9, the lower ends of which support the T-shaped plate 10, which in turn carries one end of the guard-brace D, the upper ends of bolts 9 being provided with nuts countersunk in the plate 6.

The enlarged central circular portion of the axle-plate 6 has preferably threaded therein an upwardly-extending stud or projection 12, Fig. 3, which is adapted to enter the orifice 13, formed in the center of the head-block plate, thereby permitting the latter, with its accompanying parts, to turn thereon. By this construction it is evident that the necessity of using the king-bolt is obviated and the entire structure strengthened, the threaded stud 12 being readily removed when worn and replaced by a new stud without altering the surrounding parts. The lower or axle plate in Figs. 1, 2, and 3 is at 13' shown as recessed or slotted at opposite sides in such manner as to receive the limiting or stop bolt or pin 14. This bolt 14 is provided with a relatively large head 15, which forms a rearwardly extension, said extension engaging and bearing against the upper plate 2, forming a brace, thereby preventing the bolt from bending when the same is assembled with the other parts of the invention, and said bolt is also provided with an extension or projection 16. The shank of the bolt passes upward through the head-block plate and is secured in place thereto by means of a suitable nut, as at 17. When in position, the enlarged head works in the recessed slot 13', while the projected portion 16 extends under and engages with the bottom portion of the axle-plate. The bolt 14 at the back of the axle-plate is preferably made to extend upward through the perch C. By the above-recited construction it will be evident that the parts are all united or bound firmly together, while at the same time an easy turning of the fifth-wheel thus formed is permitted.

The ends of the strap-bolts 3 4 and 7 and 8, secured to the ends of the head and axle-plates, are countersunk therein in such manner as not to interfere with the easy operation of the parts.

In Figs. 6, 7, and 8 I have shown a modification of my improvements, which for some purposes, especially for use on whiffletrees, I have found to be preferable to the construction just above described. In this construction the use of the king-bolt is also rendered unnecessary by providing one of the circular plates, as at 18, with an integral stud or projection, as at 19, adapted to be seated in an orifice 20, formed in the adjacent circular plate 21. In this form solid yoke-plates, as at 22 and 23, are used in the place of the bent strap-bolts and are held in place by means of straight bolts 24. By this arrangement of parts it will be seen that the wood is not weakened by being penetrated by bolts or screws. A segmental slot, as at 25, is formed in one of the plates, and in this slot works a limiting pin or bolt of the type shown in Fig. 8. This bolt is provided with a nut 26, washer 26', and a segmental flanged portion 27, formed integral with the shank and adjacent to said circular head portion. This segmental flange conforms in contour to and is of relatively less longitudinal diameter than the said segmental slot in which it is adapted to play.

The shank 28 extends through the adjoining circular plate and is secured rigidly thereto by any suitable nut 29. This construction I consider to form a very essential feature of my invention, as by it I am enabled to avoid the use of galling-irons and like devices. Should the flange become worn, it is only necessary to remove the bolt and insert another in its place.

I am aware of the fact that prior to my invention it has been proposed to employ means for avoiding the use of the king-bolt and galling-irons; but I believe myself to be the first one to have devised a structure wherein, in addition to avoiding the use of bolts and screws entering and weakening the wood portions of the gear, means are employed for limiting the movement of the plates of the fifth-wheel or whiffletree and at the same time permit such means to be removed and renewed without disturbing the plates themselves.

The many advantages incident to my improved structure are so evident that it is unnecessary to dwell upon the same in detail here.

Having thus described my invention, what I claim, and desire to secure by Letters Patent of the United States, is—

1. A turning mechanism for running-gears, comprising upper and lower plates, one of said plates having recessed portions on each of its edges, bolts projecting from the other plate and engaging both of said recesses, said bolts overhanging and inclosing the edges of the recessed plate to the front and rear thereof, and shoulders formed by the said recess for engaging said bolts and limiting the movement of the plates with respect to each other, a brace comprising a head having a rearwardly-extended portion formed integral with said bolts, substantially as described.

2. A turning mechanism for running-gears, comprising upper and lower plates having enlarged circular, central portions opposing each other, notches cut into the opposite edges of one of said plates, bolts comprising an extension and a head forming a brace projecting from the unnotched plate and overhanging and inclosing the notched portions of the notched plate, and shoulders formed by the notches in said notched plate limiting the movement of the plates with respect to each other by engaging the said bolts, substantially as described.

3. A fifth-wheel mechanism for running-gears comprising an upper and lower plate engaging each other, bolts carried by the upper plate and formed with enlarged head portions, flanges upon said head portions on one side thereof overhanging and inclosing the edges of the lower plate for guiding the same in its movement, and shoulders formed upon the said head portions of the bolts on the sides opposite to said flanges and engaging the under side of the upper plate for bracing the said head portions of the bolt, substantially as described.

4. A fifth-wheel mechanism for running-gears, comprising upper and lower plates, means for securing the upper plate to the bolster and reach of a vehicle, a lower plate secured to the axle of the vehicle and formed with recesses in its edges, a short bolt projecting from the upper plate and having its head engage one recess in the lower plate, a longer bolt projecting through the reach and the upper plates, its head engaging the other recess of the lower plate, said bolts having rearwardly extension bearing against the upper plate, forming a brace for said bolts, and shoulders formed by the recesses in the lower plate, being adapted to engage the heads of the bolts and limit the movement of the axle with respect to the bolster of the vehicle, substantially as described.

In testimony whereof I hereunto affix my signature in presence of two witnesses.

ALEXANDER P. McLELLAN.

Witnesses:
BENJAMIN F. OTIS,
ALICE E. TARBOX.